United States Patent [19]
Turk et al.

[11] Patent Number: 5,694,960
[45] Date of Patent: Dec. 9, 1997

[54] HAZARDOUS GAS PROTECTION SYSTEM AND METHOD FOR AUTOMATIC VALVE CLOSURE

[76] Inventors: Edward J. Turk, 6962 Carol Dr., Independence, Ohio 44131; Douglas A. Morgan, 3719 Edgehill Cir., NW., Canton, Ohio 44709

[21] Appl. No.: 743,195

[22] Filed: Nov. 5, 1996

[51] Int. Cl.[6] ............................................ F16K 17/38
[52] U.S. Cl. .................... 137/1; 137/78.5; 137/79; 251/248; 251/292; 251/294
[58] Field of Search ................ 137/78.5, 79, 80, 137/557, 1; 251/14, 62, 294, 248, 60, 292

[56] References Cited

U.S. PATENT DOCUMENTS

| | | | |
|---|---|---|---|
| 3,555,226 | 1/1971 | Spindle | 200/148 |
| 3,955,186 | 5/1976 | Green et al. | 137/78.5 |
| 4,412,670 | 11/1983 | Card et al. | 251/14 |
| 4,480,811 | 11/1984 | Card et al. | 251/14 |
| 4,531,533 | 7/1985 | Coombes | 137/46 |
| 4,866,594 | 9/1989 | David | 364/138 |
| 4,889,313 | 12/1989 | Sanchez | 251/74 |
| 5,240,028 | 8/1993 | Hoch, Jr. et al. | 137/79 |
| 5,240,034 | 8/1993 | Cornil | 137/461 |
| 5,271,425 | 12/1993 | Swartzlander | 137/46 |
| 5,579,801 | 12/1996 | Pye et al. | 137/78.5 |

FOREIGN PATENT DOCUMENTS

| | | | |
|---|---|---|---|
| 983909 | 2/1976 | Canada | 251/62 |

*Primary Examiner*—A. Michael Chambers
*Attorney, Agent, or Firm*—Joseph H. Taddeo

[57] ABSTRACT

The present invention relates to an automatic valve actuating system that is responsive to various externally detected stimuli. The system is comprised of a monitoring and alarm components that close a valve upon the detection of a fault occurring from the undesirable presence of carbon monoxide or combustible gases. Combustible gases, such as, propane, methane, hydrogen and the like can create a hazardous explosive environment, especially when these gases are mixed with the oxygen in the air. The valve actuating apparatus mounts directly to an existing valve, such as one that opens and closes within a quarter of a turn. An audible alarm is given when a hazardous condition is detected. For those who are hearing impaired, an optional visual alarm is also given. A $CO_2$ cylinder provides a pressure source to operate a pneumatic linear actuator. A low pressure switch sounds a secondary alarm to alert the maintenance personnel to replace the carbon dioxide tank.

34 Claims, 6 Drawing Sheets

5,694,960

HAZARDOUS GAS PROTECTION SYSTEM AND METHOD FOR AUTOMATIC VALVE CLOSURE

FIELD OF INVENTION

The present invention relates generally to a hazardous gas protection system that is responsive to various externally detected stimuli, and more particularly, to a hazardous gas protection system utilizing a novel valve actuating apparatus that mounts to an existing valve. The system is comprised of a monitoring and alarm components that close a valve upon the detection of a fault occurring from the undesirable presence of carbon monoxide or combustible gases. Combustible gases, such as, propane, methane, hydrogen and the like can create a hazardous explosive environment, especially when these gases are mixed with the oxygen in the air.

BACKGROUND OF THE INVENTION

There are many hazardous conditions that exist in today's environment. Some of these hazardous conditions include the inhalation of toxic agents, such as carbon monoxide; while other hazards may be due to explosive mixtures, especially when combined with air.

Carbon monoxide poisoning generally results when this agent is inhaled in sufficient quantities. Carbon monoxide is a colorless and odorless gas, that is produced when carboniferous materials are burned without sufficient oxygen for complete combustion. In this mechanical age it is probably the most widely distributed of toxic agents. It is not known how many deaths that occur each year are due to this agent, but the number is great. In various industries, as in the manufacturing of steel, mining of coal, the burning of gas and coal, carbon monoxide gas is produced in great quantities. The greatest source of this poison is from the exhaust of automobiles, where the concentration is 7%. From this source alone many thousands of persons are to some degree affected daily. Another source of this poison comes from defective gas heating systems where a furnace plenum or flue pipe has pin holes or cracks that allow carbon monoxide to escape into the living quarters.

Carbon monoxide kills because it combines with the hemoglobin of the blood, thus making it impossible for the hemoglobin to combine with oxygen, which is a necessary life process. Carbon monoxide has an affinity for hemoglobin three hundred times that of oxygen. The degree of poisoning depends on concentration of the gas and time of exposure. If the percentage of the gas in the blood rises to 70% or 80%, death is likely to result. It is a chronic form of poisoning that is believed to result in headaches, palpitation, dizziness, anemia, psychoses, and neuritis.

A major catastrophic event, such as an earthquake, can create a shift in the foundation of buildings and residences, causing pipelines and pipeline connections to rupture and leak to the atmosphere, thereby creating a potentially serious hazard. During such a cataclysmic event, furnaces, water heaters, stoves and ovens can be torn loose from their mountings, wrenching their lines loose and breaking them. When hydrogen is mixed with air or oxygen, and ignited, it becomes an explosive mixture. Also, methane and propane form explosive mixtures when each is mixed with air. The potential of an explosion is often possible from leaking or escaping gas.

When such large earth movements occur, landlords and homeowners do not know where such shutoff valves are to be found. Frequently, during an emergency, many of these persons may panic, and forget the location of the various valves that need to be closed. In addition, some shutoff valves require special tools to actuate them.

In hospitals and in nursing homes, the risks associated in manually locating and closing these valves is even greater. Warehouses and storage buildings are also vulnerable to these risks.

There are several patents that disclose various self-operating valves and safety sensors that are associated with these valves.

U.S. Pat. No. 5,271,425, granted Dec. 21, 1993, to K. K. Swartzlander, discloses a fully automatic valve closing apparatus that is responsive to movement between the apparatus and a substantially fixed structure. The apparatus which contains no electrical components is pneumatically operated from a self-contained power source.

U.S. Pat. No. 5,240,034, granted Aug. 31, 1993, to J. P. Cornil, teaches a safety and automatic stop device for interrupting the flow of gaseous fluid along a main duct by tripping a safety valve member.

U.S. Pat. No. 4,866,594, granted Sep. 12, 1989, to G. David, et al, discloses a system for monitoring and controlling distributed functions within a building, such as the pressure and temperature of gases stored within cylinders.

Other safety sensor devices can be found in U.S. Pat. No. 4,888,313, by R. Sanchez, that discloses a utility safety shutoff device and method; and in U.S. Pat. No. 4,531,533, to G. E. Commbes, et al.

As can be seen from the discussion of the previous prior art, a specialized need exists for a pneumatically actuated valve, controlled by its associated electronics, and supplied by its own integral power source.

SUMMARY OF THE INVENTION

The present invention defines apparatus that mounts to existing gas cock or plug valves, ones that are opened and closed with a quarter turn, to shut off the fluid media flow when a hazardous condition is detected. Various sensors monitor and detect the presence of hazardous gases, such as carbon monoxide, propane, methane, hydrogen and the like.

A hazardous condition can occur when carbon monoxide leaks into one's living space through a pinhole leak or crack in a furnace plenum or exhaust flue pipe. Carbon monoxide results from the incomplete combustion of carboniferous material and is extremely toxic when inhaled in sufficient quantities.

Another hazardous condition can occur when portions of a building or dwelling are moved because of a seismic disturbance, such as due to an earthquake. When the walls of a building move, the associated pipelines can be damaged to the point where they rupture and allow the gases transported by the pipelines to escape into the atmosphere. Gases such as methane, propane and hydrogen mix readily with the oxygen in the air to form an explosive mixture, creating a volatile and hazardous environment. Because these toxic gases are colorless and odorless, their detection can only be made with a reliable sensing and monitoring sensor.

As an adjunct to the present invention, a smoke and fire alarm is added to the system to augment the protection that is provided for the detection of hazardous substances.

When a hazardous condition is detected, a solenoid valve closes releasing a stored volume of carbon dioxide to actuate a pneumatic cylinder which in turn causes a gas cock or plug valve to close, blocking further flow of the hazardous gas. A gas cock or plug valve is one that is opened or closed within a quarter of a turn. A link chain that is wrapped around a sprocketed gear rotates the valve stem, closing the valve, as the pneumatic cylinder exerts a force on the chain. At the end of the stroke of the pneumatic cylinder, a switch is closed that actuates a second solenoid valve to cutoff the supply to the pneumatic cylinder. Upon operation of the valve actuating system an audible alarm is sounded to alert those of a hazardous environment. Optionally, a visual alarm can be used to augment the alarm system to alert those who may be hearing impaired.

A manual over-ride allows the valve to be opened or closed manually in the event of a system failure, such as a reduction in the pressure supplied volume of carbon dioxide. A low pressure switch detects when there is an insufficient pressure to operate the air cylinder. A second alarm, of a different sound quality, is sounded to alert the maintenance personnel to replace the carbon dioxide tank.

It is an object of the present invention to provide for a valve actuating system that mounts to an existing valve to interrupt the supply of toxic and harmful fluids.

It is another object of this invention to provide for a valve actuating system that monitors and detects the presence of toxic gases, sounds an audible alarm, and closes a valve shutting off the source of these fluids.

Yet, it another object of this invention to provide for a valve actuating system that has a gas powered source to actuate a linear pneumatic cylinder.

Still, it another object of this invention to provide for a valve actuating system that uses a linear motion air cylinder to translate into a quarter turn rotational motion to open or close an existing valve.

An additional object of this invention is to provide for a valve actuating system that uses a low pressure detection means that sounds an alarm when the operating pressure source becomes too low to operate the air cylinder.

And, still another added object of this invention is to provide for a valve actuating system that can be manually operated to override the system in the event of a catastrophic failure.

One other object of this invention is to provide for a valve actuating system that is supplied by its own integral power source and is independent from any other external power sources.

It is a final object of this invention to provide for a valve actuating system that is reliable in operation and is cost effective to manufacture and install.

These and other objects and advantages of this invention will become more apparent from the detailed description that follows with accompanying drawings. The example that follows represents only one embodiment and after considering this example, those who are skilled in the art will understand that changes and variations can be made without departing from the spirit of the invention.

BRIEF DESCRIPTION OF THE DRAWINGS

The invention is diagrammatically illustrated in the following drawings attached herein.

DESCRIPTION OF THE PREFERRED EMBODIMENT

Figure 1:
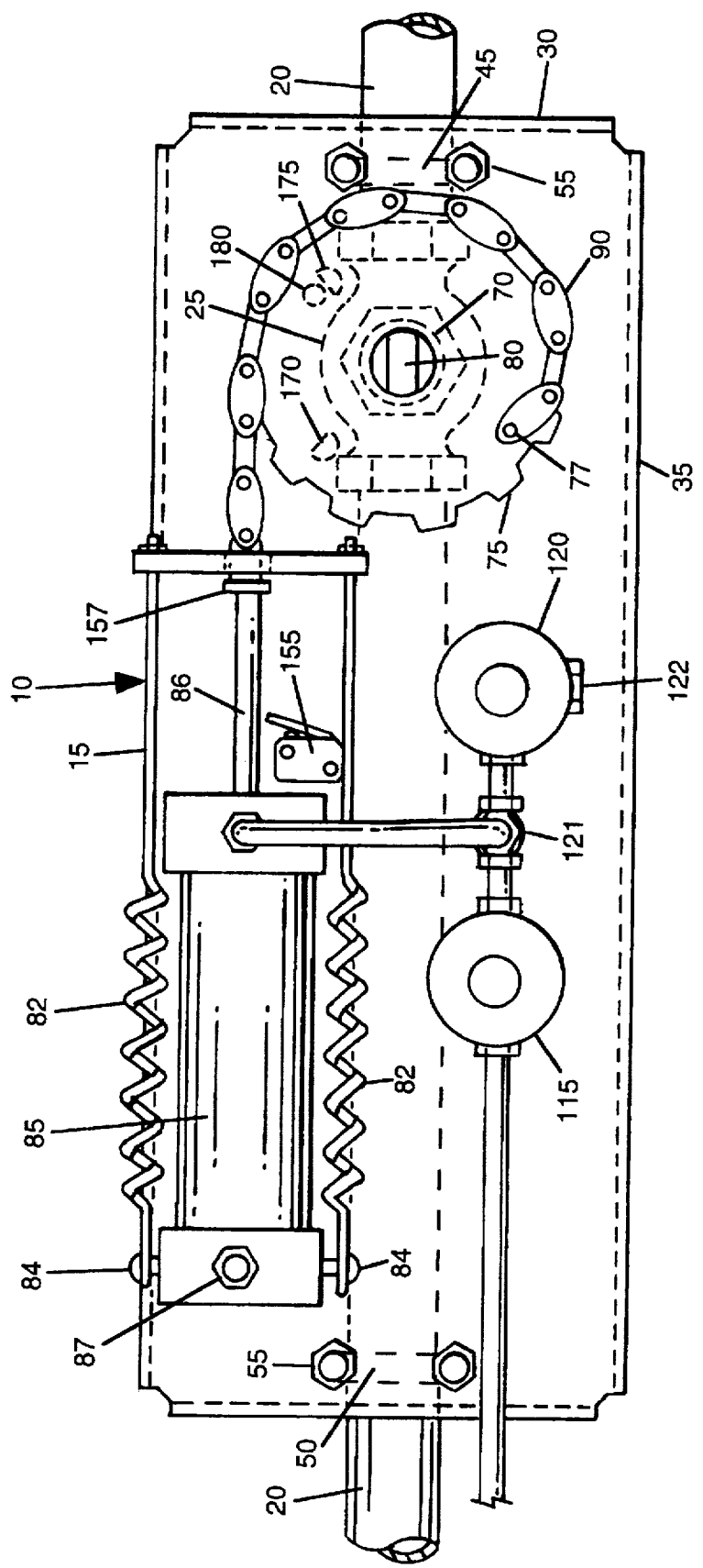
FIG. 1 is a top elevational view of the valve actuating apparatus that is mounted to a typical existing gas cock valve.
Figure 2:
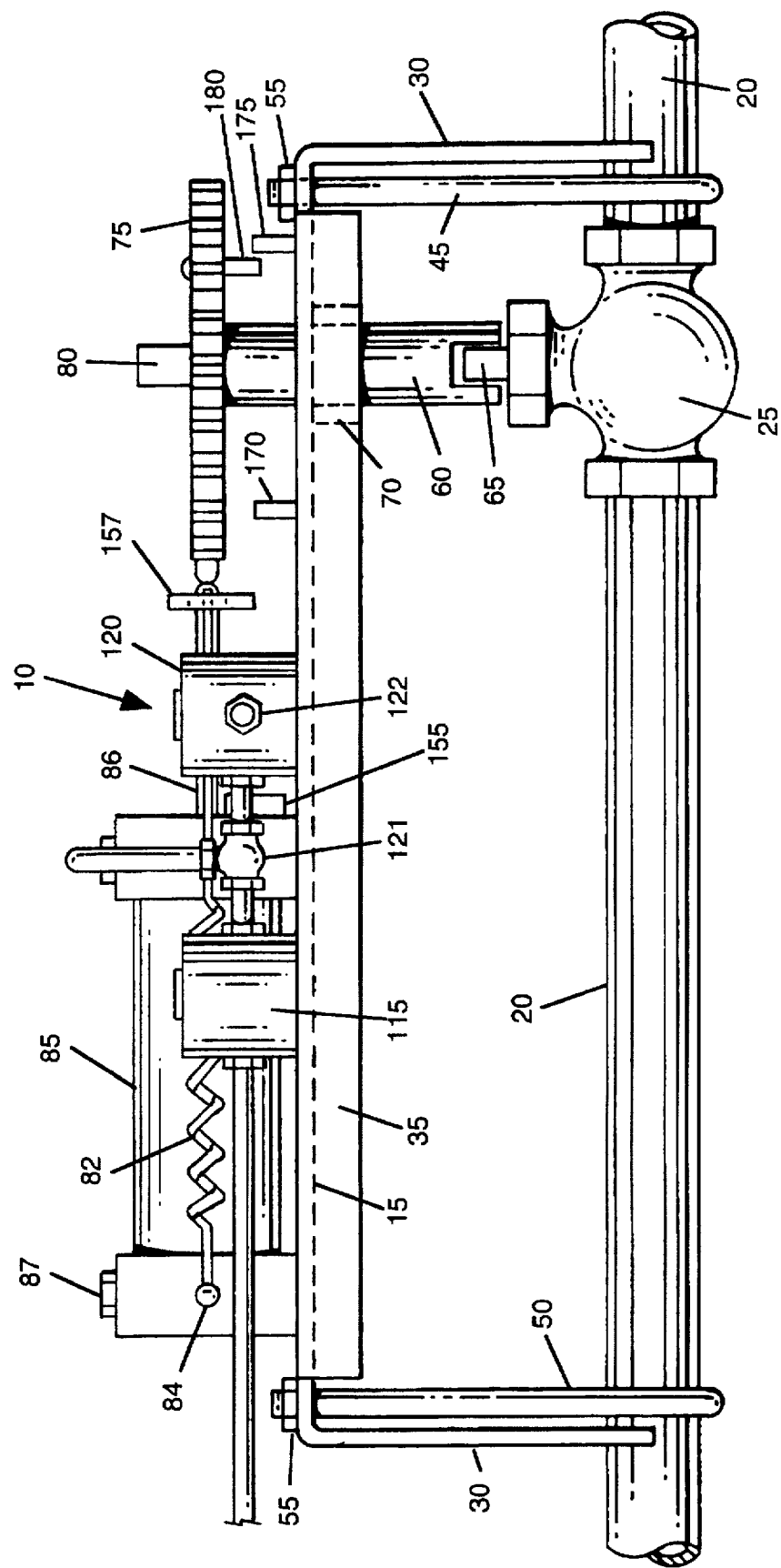
FIG. 2 is a side elevational view of the valve actuating apparatus.
Figure 3:
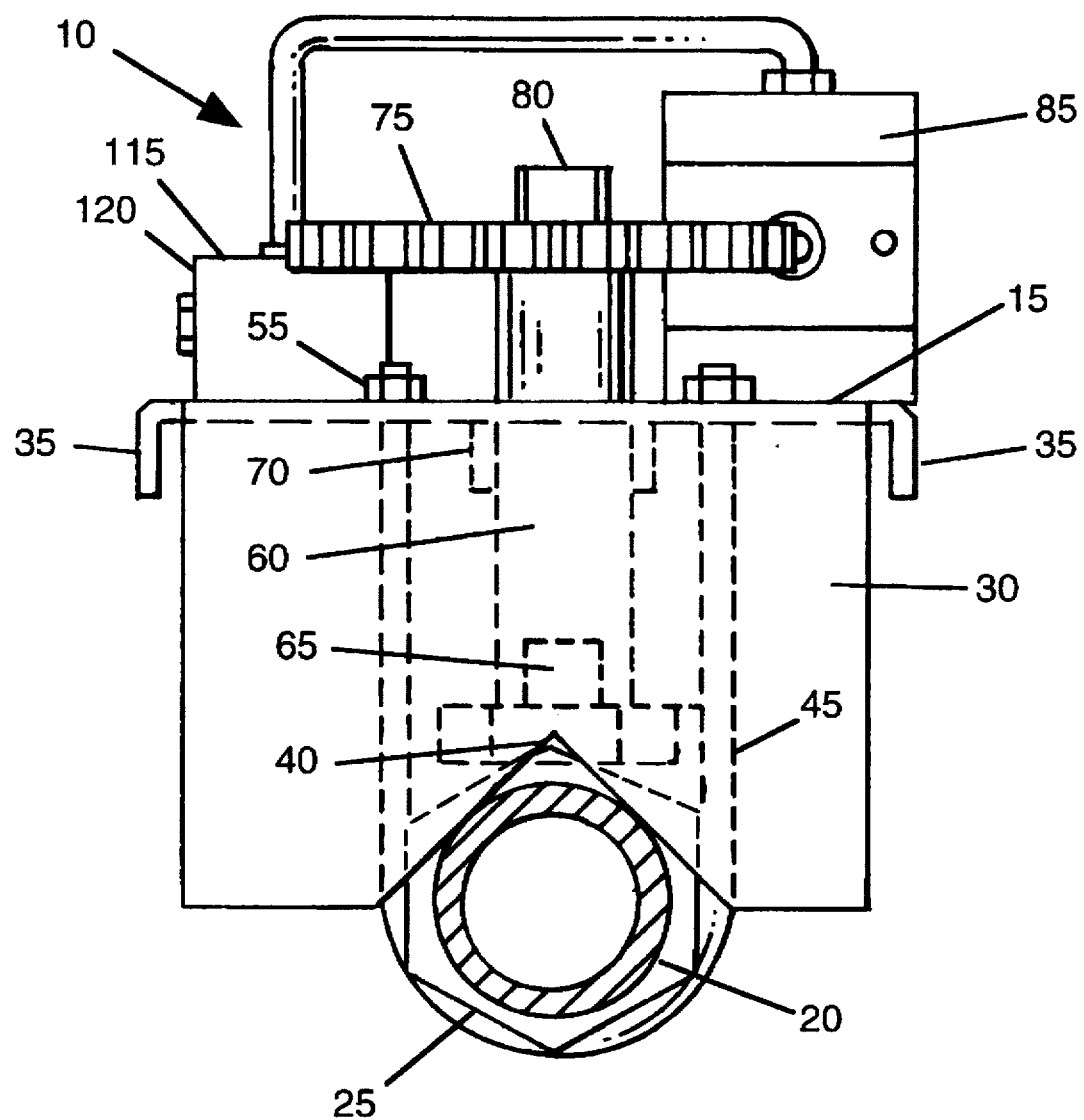
FIG. 3 is an end view illustrating a transverse section of the valve actuating system.

Referring now to FIG. 1, there is shown a top view of the present invention which is defined as a valve actuating apparatus that mounts to an existing valve, the apparatus being indicated as 10. The frame member 15 mounts to an existing fluid flow pipeline 20, while straddling the in-line valve 25. The frame member 15 is formed from sheet metal where the ends 30 are bent at a 90 degree angle as shown in FIGS. 2 and 3. The notched ends 40 center the positioning and mounting of frame member 15. The sides 35 are turned downward to add rigidity to the frame member 15. Two U-bolts 45 and 50 securely attach the frame member 15 to the existing pipeline 20 by tightening the hex-nuts 55.

Mounted to frame member 15 are the components comprising the valve actuating apparatus. The actuator shaft 60 engages the valve stem 65 and is supported by the actuator shaft bearing 70. Mounted to the top of the actuator shaft 60 is sprocketed gear 75. In the event that an emergency condition exists where the system fails to properly close the valve when a hazardous condition is detected, a manual override can be used to close the valve. A wrench can be used to engage the parallel sided stem 80 to close the valve.

A double acting pneumatic cylinder 85 provides the necessary force to rotate the valve. A link chain 90 connects to the end of the cylinder piston rod and is wrapped around the sprocketed gear 75 and is pinned to the sprocket with pin 77. Retraction springs 82 maintain the proper amount of tension on the link chain to keep it firmly in place around the gear. Port 87 is vented to the atmosphere to allow full travel of the pneumatic cylinder 85.

Figure 4:
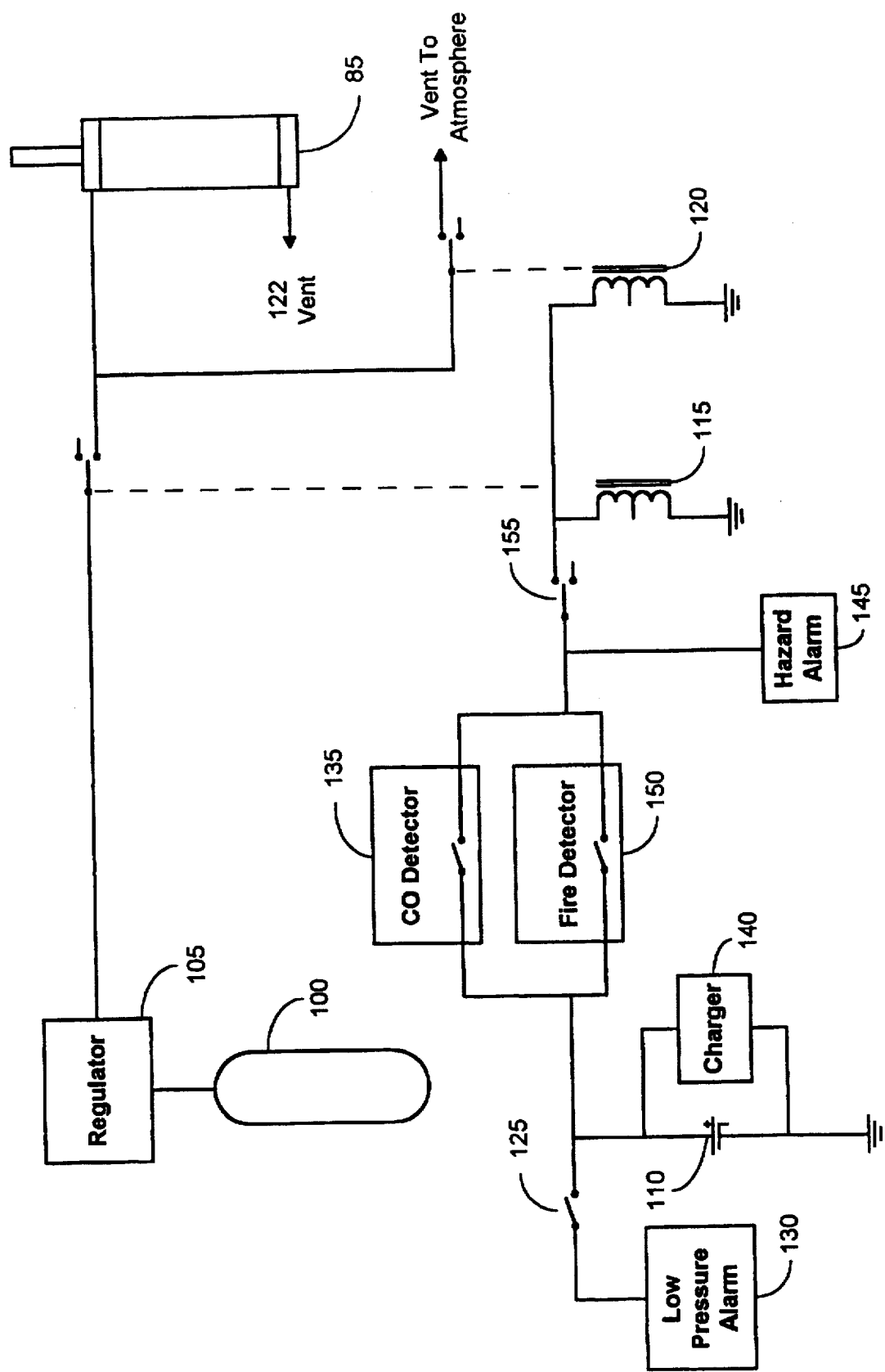
FIG. 4 is a detailed schematic representation of the electrical and pneumatic circuits.

Turning now to FIG. 4, schematically shown are the remaining components comprising the system. The entire valve actuation system is remotely powered by both, a tank 100, containing $CO_2$ and a rechargeable battery 110. The charge on the rechargeable battery is maintained by trickle charger 140. The $CO_2$ tank 100 supplies the power to operate the air cylinder via regulator 105; a rechargeable battery 110 supplies the electrical power to operate the solenoid valves 115 and 120. A small trickle charger is used to maintain the charge on the rechargeable battery 110.

In the event of a loss of power, the system continues to operate without any intervention. Should a catastrophic event occur, including a power outage, the system remains in a state of readiness, ready to provide reliable operation in closing the gas valve should a fault be detected.

Hazardous gas detector 135 provides continuous monitoring of the condition of the surrounding atmosphere. This detector is a continuous duty carbon monoxide and combustible gas monitoring. The unit detect the presence of carbon monoxide, propane, methane or hydrogen. An alarm sounds whenever the preset limits are reached: 150 ppm. for carbon monoxide, 2000 ppm. for propane, 3000 ppm. for methane and 40 ppm. for hydrogen. A relay closure connects to an external alarm.

The closure of either relay contact, found in the hazardous gas detector 135 or in fire detector 150 energizes the coil of the normally closed solenoid valve 115 and simultaneously, energizes the coil of the normally open solenoid valve 120.

Solenoid valve 120 is normally vented to the atmosphere via port 122 when de-energized. With port 122 vented to the atmosphere, the air cylinder 85 is in a state ready to close the existing gas valve 25. In this condition, the shaft 80 can be manually operated to either open or close the main gas valve. If solenoid valve 120 were not at atmospheric pressure, a negative pressure or vacuum would be created in the pull side of the air cylinder 85 and prevent the piston rod 86 from being moved into the air cylinder. Retraction springs 82 are secured to the piston rod 86 with bracket and trip lever 157. The opposite end of spring 82 is attached to roll pin 84. Springs 82 serves two purposes: they maintain tension on the chain at all times, ensuring full contact with the sprocket to transmit the maximum torque to the shaft, and secondly, they retract the piston rod into the cylinder during manual operation to prevent the chain from unwinding from the sprocket and potentially rendering the actuator ineffective during future operation.

The flow of $CO_2$ retracts the piston and rod, while applying approximately 1100 pounds of force to chain 90. Once the piston rod is retracted into the air cylinder 85, which is equivalent to rotating shaft 80 one-quarter turn, lever 157 attached to the end of the piston rod trips and subsequently actuates the piston rod travel limit switch 155. At this point, the shaft 80 has been rotated a quarter of a turn and has shut off the flow of gas through the main gas valve. Actuation of travel limit switch 155 in turn de-energizes the solenoid valve 115, returning it to its normally closed state. De-energizing solenoid valve 115 therefore shuts off the supply of carbon dioxide flowing into the pull side of the air cylinder 85, thereby stopping the further travel of the piston and rod. Actuating travel limit switch 155 also de-energizes solenoid valve 120 returning it to its normally open state and placing the pull side of the air cylinder to atmospheric pressure thereby allowing uninhibited and proper manual operation of shaft 80 to operate the main gas valve, when required. It should be noted that port 87 on push side of air cylinder is always at atmospheric pressure to allow free piston travel of the air cylinder.

The time that it takes from the moment the alarm is initiated to the time it takes to rotate the valve 90 degrees is approximately 10 seconds.

Low pressure switch 125 detects when there is an insufficient pressure to operate the air cylinder. A second alarm 130, one that detects a low pressure, produces a different distinct sound quality. It sounds to alert the maintenance personnel to replace the tank 100, which contains the carbon dioxide.

The contacts of a smoke and fire detector 150 parallel the contacts used in the CO and hazardous gas detector 135. If either the smoke and fire detector 150 or the CO and hazardous gas detector 135 detect the presence of a toxic or hazardous substance, the hazardous substance alarm 145 is sounded.

In a typical application, a standard type residential type gas valve requires approximately 23 ft-lbs. of torque to rotate the valve. Mechanical stops 170 and 175 are provided so that rotation of the sprocket and valve cannot exceed 90 degrees.

The measured stroke of the air cylinder is nominally 4 inches to cause 90 degrees of rotation of the output shaft of the actuator, when using a six inch diameter sprocketed gear. The double acting air cylinder, having a 4 inch bore develops 1131 lbs. force with 100 psi. applied to the cylinder. The resulting torque at the actuator output shaft is approximately 283 ft-lbs. The stall torque at the output shaft of the actuator ranges between 60 and 100 ft-lbs. with 100 psi. applied, which more than sufficient to reliably rotate a standard type residential gas valve.

The preferred embodiment of this invention has been set forth for the purpose of disclosure. Modifications to the preferred embodiment may occur to those skilled in the art, but should not detract from the embodiment disclosed.

Figure 5:
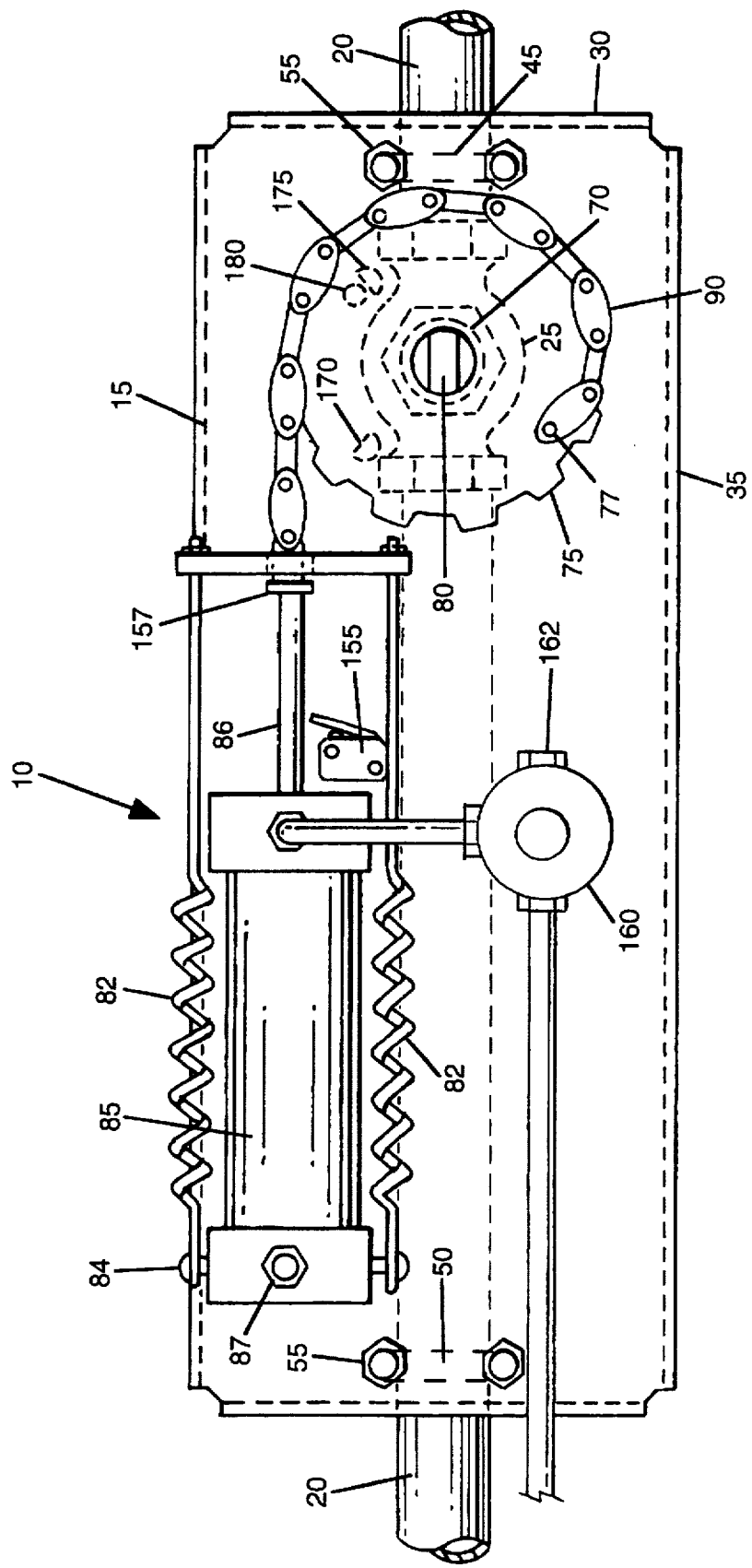
FIG. 5 is a top elevational view of an alternate embodiment showing the valve actuating apparatus mounted to a typical existing gas cock valve.
Figure 6:
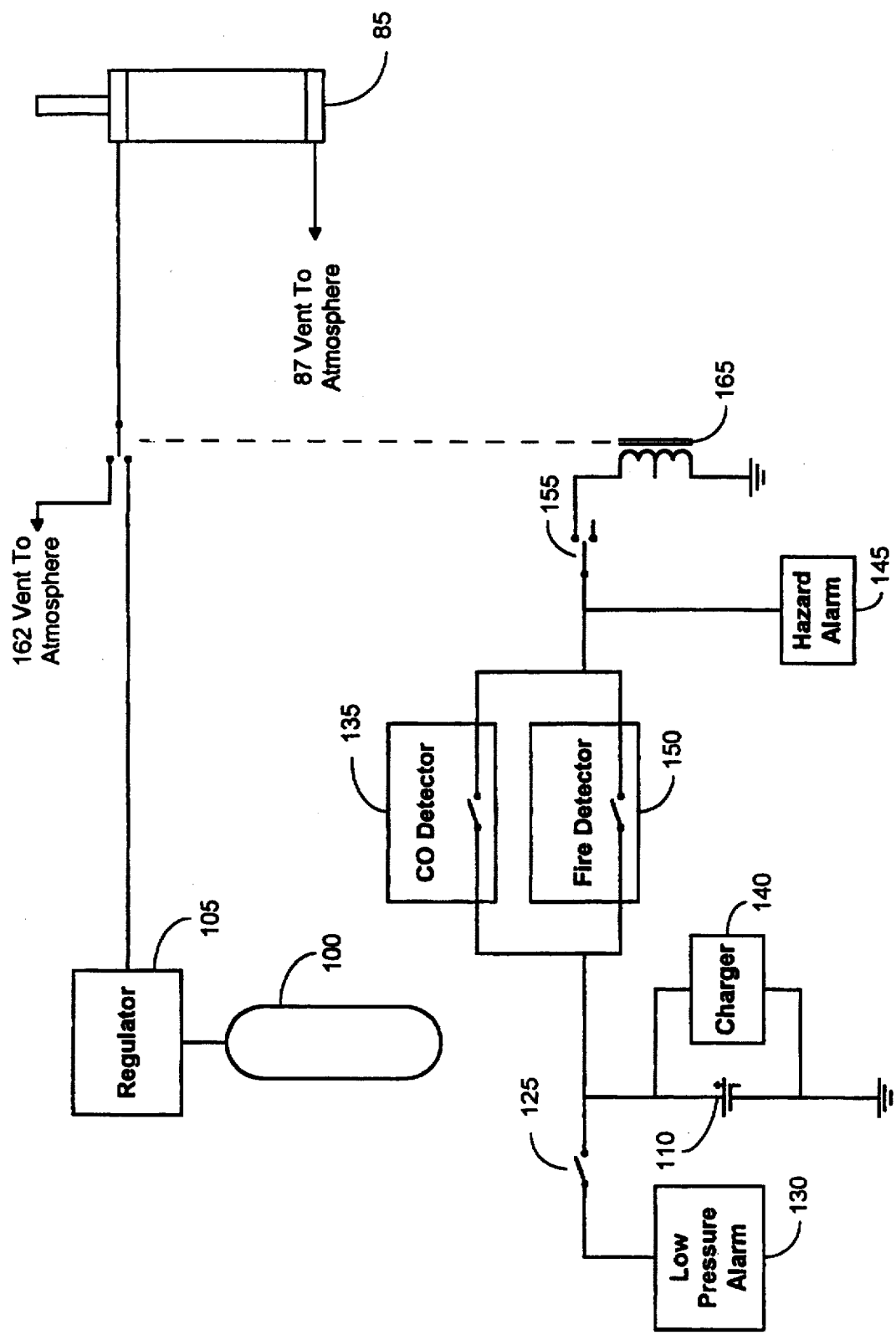
FIG. 6 is a detailed schematic representation of the electrical and pneumatic circuits of the alternate embodiment shown in FIG. 5.

One such example, as shown in FIGS. 5 and 6 as an alternate embodiment, is to add a solenoid valve to provide a means of actuating the linear pneumatic cylinder with only a single, normally closed, 3-way valve 160. Solenoid valve 160 is normally vented to the atmosphere via port 162 when de-energized. With port 162 vented to the atmosphere, the air cylinder 85 is in a state ready to close the existing gas valve 25. In this condition, the shaft 80 can be manually operated to either open or close the main gas valve.

When the 3-way solenoid valve 160 is energized, it allows $CO_2$ to flow through it, into the pull side of the actuator, causing springs 82 to exert sufficient force to keep the chain taut about the driven sprocket. Once the piston rod is retracted into the air cylinder 85, which is equivalent to rotating shaft 80 one-quarter turn, lever 157 attached to the end of the piston rod trips and subsequently actuates the piston rod travel limit switch 155. Actuation of travel limit switch 155 in turn de-energizes the solenoid valve 160, returning it to its normally closed state. De-energizing solenoid valve 160 therefore shuts off the supply of carbon dioxide flowing into the pull side of the air cylinder 85, thereby stopping the further travel of the piston and rod. Mechanical stops 170 and 175 are provided so that rotation of the sprocket and valve cannot exceed 90 degrees.

What is claimed is:

1. A method for automatic closure of a pipeline valve, the closure triggered by detection of a hazardous gas, by use of a valve actuation system having a circuitry with a self-contained power source and an alarm means, a hazardous gas detection means with relays to provide an output signal to trigger the actuation means, a valve rotation means that articulates with a standard gas valve having a normally open position and a closed position, and an actuation means for activating the rotation means upon detection of hazardous gas, said actuation means including a low pressure alarm means, comprising the steps of:

detecting a hazardous gas by the detection means;

enabling power to the system by automatic closure of the detection means relays upon detection of hazardous gas;

generating an output signal from the detection means to the actuation means;

triggering the actuation means with said generated output signal;

activating the rotation means for rotating the valve to the closed position;

outputting a plurality of alarm signals in connection with detection of the hazardous gas; and, detecting when there is an insufficient pressure to operate the actuation means.

2. A valve actuation system for use with a standard gas pipeline cock valve of a type having open and closed positions, with a normally open position, and an integral valve stem operable by a quarter of a turn thereof to close the valve, the system adapted for detection of hazardous gas, to provide an alarm for the detection of hazardous gas, and to automatically shut off a pipeline fluid flow by valve closure, the system comprising:

a frame member mounted on a pipeline having a gas cock valve for terminating a fluid flow in the pipeline, the frame positioned over the valve thereof;

a valve rotation means secured to the frame member and in articulation with a valve stem;

a valve system circuitry having an actuation means in communication with the valve rotation means, said actuation means including a low pressure alarm means, a detection means in communication with the actuation means for generating an output signal to the actuation means, and a power source for energizing the circuitry, whereby the detection means responds to an excess hazardous gas level in the ambient atmosphere to provide a signal causing the actuation means to impel the valve rotation means for a quarter of a turn of the valve stem to achieve an automatic closure of the valve.

3. A valve actuation system according to claim 2, wherein the power source is a self-contained, integral power source that is independent from any other external power sources, such that in the event of a power loss, the system will remain in a condition of operative readiness without any intervention; and, wherein the frame member centrally straddles the pipeline and in-line valve.

4. A valve actuation system according to claim 3, wherein the self-contained, integral power source comprises a rechargeable battery that includes a charge maintenance means for supplying electrical power to operate the system.

5. A valve actuation system according to claim 2, the charge maintenance means of the self-contained, integral power source comprising a trickle charger that is associated with the rechargeable battery, the trickle charger adapted to maintain a charge on the rechargeable battery.

6. A valve actuation system as described in claim 5, wherein the detection means comprises a first detector having sensors for identifying smoke and fire and to provide an output signal for the hazard detected.

7. A valve actuation system as described in claim 6, the detection means further comprising a second detector having sensors for identifying hazardous gases including carbon monoxide, propane, methane, and hydrogen, and to provide an output signal for the hazardous gas detected.

8. A valve actuation system according to claim 7, wherein the first and second detectors are in parallel in the system circuitry.

9. A valve actuation system according to claim 8, further comprising first and second relays in communication respectively with the first and second detectors on the system circuit, the first and second relays adapted for closure to energize the circuit consequent to a detection means output signal.

10. A valve actuation system according to claim 9, wherein the valve system circuit further comprises a first alarm means adapted to receive the detection means signal upon closure of the first relay, for output of a plurality of alarm signals in connection with detection of a hazardous gas.

11. A valve actuation system according to claim 10, wherein the plurality of alarm signals comprises a video signal.

12. A valve actuation system according to claim 11, wherein the plurality of alarm signals further comprises an audio signal.

13. A valve actuation system according to claim 12, wherein the valve rotation means comprises a rotatable actuator shaft with upper and lower portions, the shaft secured on the frame by a shaft bearing near the upper portion and the lower shaft portion engaging the cock valve stem;

a sprocket gear extending radially from the upper portion of the actuator shaft;

a pneumatic cylinder fixed on the frame, the cylinder having a right, pull side and a left, push side, with a double action piston having a piston rod, the piston installed in, and normally positioned near the right, pull side of the cylinder, for providing a force necessary to rotate the valve;

a container holding a pressurized gas in fluid communication with the cylinder right side;

a link chain having first and second ends, the chain mounted on the sprocket gear with the first chain end anchored to the sprocket; a spring assembly attached to the second chain end and to the cylinder to apply a tension and retain the chain in position on the sprocket gear; the second chain end connected to the rod for coaction between the piston and the sprocket gear; and, a switch means in the circuit between the cylinder and the container, the switch means adapted to close by an output from the actuation means to complete the circuit, to impel pressurized gas into the right side of the cylinder and drive the piston toward the left side of the cylinder, with a consequent draw on the chain, thereby translating a linear force of the piston to a rotary motion of the sprocket gear, shaft and valve stem for closure of the valve.

14. A valve actuation system according to claim 13, the actuation means comprising a 3-way solenoid valve that is on the system circuitry in communication with the detection means, and in fluid communication with the cylinder and the container, the 3-way solenoid having a vent port and normally vented to the atmosphere when de-energized to allow full travel of the piston within the double acting cylinder and for manual operation to open or close the gas valve, such that when the 3-way solenoid valve is energized by a signal from the detection means, pressurized gas flows into pull side of the cylinder, and drives the piston toward the left side of the cylinder, with a consequent draw on the chain, thereby translating a linear force of the piston to provide a rotary motion on the sprocket gear, the actuator shaft and valve stem for closure of the valve.

15. A hazardous gas protection system for installation on a fluid pipeline having a rotatable valve for interaction with the valve and to provide a warning upon detection of hazardous gas, the protection system comprising in combination:

a system circuitry having a self-contained power source, a hazardous gas detection means to energize the system upon detection of a hazardous gas, and an actuation means that generates a linear force when the system is energized, said actuation means including a low pressure alarm means;

a valve rotation means in articulation with the rotatable pipeline valve, that converts said linear force to a rotation torque force on the rotatable valve, whereby the pipeline valve is automatically rotated for automatic valve closure upon detection of a hazardous gas by the system; and, the system circuitry further comprising a warning signal means in communication with the hazardous gas detection means, whereby the system provides a warning of the presence of a hazardous gas while closing the valve.

16. A valve actuation system for use with a standard gas pipeline cock valve of a type having open and closed positions, with a normally open position, and an integral valve stem operable by a quarter of a turn thereof to close the valve, the system adapted for detection of hazardous gas, to provide an alarm for the detection of hazardous gas, and to automatically shut off a pipeline fluid flow by valve closure, the system comprising:

a frame member mounted on a pipeline having a gas cock valve for terminating a fluid flow in the pipeline, the frame positioned over the valve thereof;

a valve rotation means secured to the frame member and in articulation with a valve stem;

a valve system circuitry having an actuation means in communication with the valve rotation means, a detection means in communication with the actuation means for generating an output signal to the actuation means, and a power source for energizing the circuitry;

wherein the power source is a self-contained, integral power source that is independent from any other external power sources, comprising a rechargeable battery for supplying electrical power to operate the system, with a trickle charger adapted to maintain a charge on the rechargeable battery;

wherein the detection means comprises a first detector having sensors for identifying smoke and fire and to provide an output signal for the hazard detected; and a second detector having sensors for identifying hazardous gases including carbon monoxide, propane, methane, and hydrogen, and to provide an output signal for the hazardous gas detected; the first and second detectors are in parallel in the system circuitry;

further comprising first and second relays in communication respectively with the first and second detectors on the system circuit, the first and second relays adapted for closure to energize the circuit consequent to a detection means output signal;

wherein the valve system circuit further comprises a first alarm means adapted to receive the detection means signal upon closure of the first relay, for output of a plurality of alarm signals in connection with detection of a hazardous gas, the plurality of alarm signals comprising a video signal and further comprising an audio signal;

wherein the valve rotation means comprises a rotatable actuator shaft with upper and lower portions, the shaft secured on the frame by a shaft bearing near the upper portion and the lower shaft portion engaging the cock valve stem;

a sprocket gear extending radially from the upper portion of the actuator shaft;

a pneumatic cylinder fixed on the frame, the cylinder having a right, pull side and a left, push side, with a double action piston having a piston rod, the piston installed in, and normally positioned near the right, pull side of the cylinder, for providing a force necessary to rotate the valve;

a container holding a pressurized gas in fluid communication with the cylinder right side;

a link chain having first and second ends, the chain mounted on the sprocket gear with the first chain end anchored to the sprocket; a spring assembly attached to the second chain end and to the cylinder to apply a tension and retain the chain in position on the sprocket gear; the second chain end connected to the rod for coaction between the piston and the sprocket gear; and, a switch means in the circuit between the cylinder and the container, the switch means adapted to close by an output from the actuation means to complete the circuit, to impel pressurized gas into the right side of the cylinder and drive the piston toward the left side of the cylinder, with a consequent draw on the chain, thereby translating a linear force of the piston to a rotary motion of the sprocket gear, shaft and valve stem for closure of the valve.

17. A valve actuation system according to claim 16, wherein the actuation means comprises a first solenoid valve on the system circuitry in communication with the detection means, and in fluid communication with the container, the first solenoid having a normally closed condition and an open condition, the first solenoid valve adapted to open upon receiving a detector means output signal, thereby causing the pressurized gas to flow into the right-hand chamber of the cylinder.

18. A valve actuation system according to claim 17, wherein the actuation means further comprises a second solenoid valve that is on the system circuitry in communication with the detection means and a tee for interconnection of the first and second solenoid valves, and the second solenoid valve in fluid communication with the container and with the first solenoid through the tee, the second solenoid having a normally open condition and a closed condition, the second solenoid valve adapted for closure upon receiving a detector means output signal, thereby effectively terminating fluid communication between the second solenoid, the first solenoid and the cylinder, causing the pressurized gas to flow into the right-hand chamber of the cylinder.

19. A valve actuation system according to claim 18, further comprising a means for manual override for manually setting the gas pipeline cock valve to a desired open or closed position.

20. A valve actuation system according to claim 19, wherein the means for manual override comprises a secondary valve stem having parallel sides, the secondary valve stem positioned on the actuator shaft upper portion, the parallel sided secondary valve stem adapted to be engaged by a wrench to manually open or close a standard, closure valve.

21. A valve actuator system according to claim 20, wherein the second solenoid valve further comprises a venting port to relieve pressure on the cylinder, thereby enabling manual closure of the standard gas cock valve.

22. A valve actuation system according to claim 21, further comprising a piston stop means associated with the piston rod, the piston stop means adapted for shutting off the supply of pressurized gas to the cylinder to stop motion of the piston.

23. A valve actuation system according to claim 22, the piston stop means comprising a travel limit lever projecting from piston the rod and a limit switch positioned near the piston rod; the limit switch on the system circuit in communication with the second solenoid, the lever positioned to trip the limit switch when the piston is driven toward the left cylinder side, de-energize the second solenoid valve to shut off the supply of pressurized gas to the cylinder and provide a stop action for the piston rod.

24. A valve actuation system according to claim 23, the low pressure alarm means comprising a low pressure second alarm and an associated low pressure switch associated with the container of pressurized gas and the rechargeable battery, for detecting when there is an insufficient pressure to operate the air cylinder.

25. A valve actuation system according to claim 24, the frame member further comprising four fastener holes, a pair of U-bolts with threaded ends and hex-nuts for installation on each of the U-bolt ends, each of the U-bolt pair adapted for insertion over an existing pipeline with the threaded ends inserted in the fastener holes of the frame member, such that by tightening the hex-nuts on the threaded ends, the frame member is securely attached to a pipeline.

26. A valve actuation system according to claim 25, the frame member is constructed of a material that comprises sheet metal, the frame member having two ends, with the ends bent downward toward the pipeline, the bent ends further comprising notches in each of the two ends, the notched ends adapted to center the positioning and mounting of the frame member on the pipeline over the standard cock valve.

27. A valve actuation system according to claim 26, further comprising in combination, the sprocketed gear having a diameter, that diameter being essentially a six inch diameter; the double acting cylinder having a round bore hole therethrough with an internal diameter, and a developed force upon application of a pressurized gas to the cylinder, the bore internal diameter being essentially four inches, and a force being essentially 1131 lbs. upon application of 100 psi by pressurized gas to the cylinder; the actuator shaft having a resultant torque from a developed linear force from the cylinder, the resultant torque of the actuator shaft being essentially 283 ft-lbs; the actuator shaft further having a stall torque within a range upon application of 100 psi by pressurized gas to the cylinder, the shaft stall torque ranging from 60 to 100 ft-lbs.

28. A valve actuation system according to claim 27, wherein the second detector further comprises preset limits for yielding an output signal, the limits essentially comprising 150 ppm for carbon monoxide, 2000 ppm for propane, 3000 ppm for methane and 40 ppm for hydrogen.

29. A valve actuation system according to claim 28, wherein the container with a pressurized gas is installed in a position that is remote from the power source, the detection means, the actuating means and the valve rotation means, for reducing a hazard associated with the container having a pressurized gas.

30. A valve actuation system according to claim 29, wherein the low pressure second alarm for detection of a low container pressure, produces a different, distinct sound quality to alert maintenance personnel to replace the container having a pressurized gas.

31. A valve actuation system according to claim 30, the sprocket gear further comprising mechanical stops associated with the sprocket for limiting a rotation of the sprocket and valve to a quarter of a turn.

32. A valve actuation system as described in claim 31, the cylinder further comprising a venting port on the left side thereof, for assurance that the push side of the cylinder remains at atmospheric pressure to free the piston for travel within the cylinder.

33. A valve actuation system according to claim 32, wherein the system mounts onto a standard cock valve and pipeline without degredation to either the valve or pipeline.

34. A valve actuation system according to claim 33, wherein the system is transparent to the standard cock valve and pipeline, such that the standard cock valve is adapted for operation in opening and closure thereof, as though the system were not installed.

* * * * *